(12) United States Patent
Berenberg et al.

(10) Patent No.: US 10,812,366 B1
(45) Date of Patent: Oct. 20, 2020

(54) SYSTEM AND METHOD FOR DEPLOYING, SCALING AND MANAGING NETWORK ENDPOINT GROUPS IN CLOUD COMPUTING ENVIRONMENTS

(71) Applicant: Google LLC, Mountain View, CA (US)

(72) Inventors: Anna Berenberg, Saratoga, CA (US); Venkat Subbaiah Naidu Kotla, Cupertino, CA (US); Neha Pattan, Mountain View, CA (US); Uday Ramakrishna Naik, Pleasanton, CA (US); Prajakta Joshi, Mountain View, CA (US); Ines Envid, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/118,775

(22) Filed: Aug. 31, 2018

Related U.S. Application Data

(60) Provisional application No. 62/553,037, filed on Aug. 31, 2017.

(51) Int. Cl.
*H04W 28/08* (2009.01)
*H04L 12/751* (2013.01)
*H04L 29/12* (2006.01)
*H04L 29/08* (2006.01)

(52) U.S. Cl.
CPC .......... *H04L 45/02* (2013.01); *H04L 61/2007* (2013.01); *H04L 67/1002* (2013.01); *H04L 67/02* (2013.01); *H04L 67/28* (2013.01)

(58) Field of Classification Search
CPC ...... H04L 47/125; H04L 69/22; H04W 28/08; H04W 36/22; H04W 24/02
See application file for complete search history.

(56) References Cited

U.S. PATENT DOCUMENTS

| | | | |
|---|---|---|---|
| 7,260,716 B1* | 8/2007 | Srivastava | H04L 9/0825 380/264 |
| 2014/0359131 A1* | 12/2014 | Seed | H04W 4/70 709/226 |
| 2016/0119817 A1* | 4/2016 | Okamura | H04W 4/18 455/552.1 |

\* cited by examiner

*Primary Examiner* — Jamal Javaid
(74) *Attorney, Agent, or Firm* — Lerner, David, Littenberg, Krumholz & Mentlik, LLP

(57) ABSTRACT

Grouping virtualized computing instances in cloud environments can be achieved utilizing groups of network endpoints, such as hardware devices, virtualized computing instances, etc. The network endpoint group (NEG) provides a logical grouping for providers of backend services that may be arranged on the network endpoints, and may be organized based on the backend service to be provided by the computing environments that operate as network endpoints. For example, the NEGs may be implemented for load balancing applications. The network endpoint groups, and the network endpoints included therein, may be managed using a framework of tools, libraries and application programming interfaces.

19 Claims, 7 Drawing Sheets

US 10,812,366 B1

SYSTEM AND METHOD FOR DEPLOYING, SCALING AND MANAGING NETWORK ENDPOINT GROUPS IN CLOUD COMPUTING ENVIRONMENTS

CROSS-REFERENCE TO RELATED APPLICATIONS

The present application claims the benefit of the filing date of U.S. Provisional Patent Application No. 62/553,037 filed Aug. 31, 2017, the disclosure of which is hereby incorporated herein by reference.

BACKGROUND

Virtualization refers to a framework or methodology for allocating the resources of a computer into multiple execution environments. Virtualization improves system and resource utilization through methods such as partitioning hardware or software resources, time-sharing across compute resources, as well as emulation and simulation of partial or complete machines. The partitioning may be implemented physically, by distributing computing resources so they do not physically reside in a single machine. Additionally, the partitioning may be implemented logically, by distributing computing resources based on common processing tasks, workloads, services or applications. Virtualization system and methods use the concept of abstraction to separate or group physical and logical computing resources.

Virtualized computing resources are commonly implemented on virtual machines. A virtual machine is an emulation of a computer system. A virtual machine provides the experience and functionality of a physical computer and operates as an isolated, efficient duplicate of a real, physical computer machine. A virtual machine may also include specialized hardware, software, or combinations thereof to implement, execute, and manage functionality and/or processing. For example, a virtual machine can include a host operating system (OS) residing on the host machine hardware. The host machine may include specialized virtualization software, e.g., a hypervisor, to manage multiple virtual machines that are implemented on the host machine. Each virtual machine is fully isolated from other virtual machines on the host machine and is configured with a guest OS and one or more applications. The hypervisor emulates the host machine CPU, memory, and network capabilities to enable sharing of these resources by the virtual machines. Virtual machines can often be migrated between virtualized environments with little concern for hardware or system OS interoperability.

Containers are an alternate form of virtualized computing resource providing additional benefits compared to virtual machines. Containerized architectures have arisen as a new deployment model based on OS-level virtualization, rather than deployment models using hardware virtualization. A container or containerized environment may be configured on a host machine atop the host OS. The container environment includes a container layer which manages the provision of the host OS resources and applications to multiple container instances. In a containerized environment, each container instance shares the same underlying OS, the host OS, and utilizes the host OS kernel to run the multiple instances of the host OS. In some implementations, each container instance may be configured in a virtual machine. The containers have their own file system and are completely isolated from other container instances. This independence enables greater security for containerized environments. Containers may be considered more resource-efficient than virtual machines because containers do not require additional resources to implement a guest OS as is required for virtual machines. Containers are also easier to deploy or migrate within virtualized environments because containers are decoupled from the underlying infrastructure and file systems of the host environment, but containers can typically be migrated to environments with compatible OS kernels. Containers are often more desirable for cloud computing environments because of the increased security and the ability to deploy more containers or container instances across a fixed number of servers or other hardware resources to achieve greater resource utilization. The small, fast capabilities of containers make them ideal for configuring one application in each container image, and thus enable finger grained management (e.g. load balancing) of the application executing in the container.

Cloud computing enables users to consume computing resources or services from service providers via the internet. Cloud computing allows service providers to provide additional functionality using virtualized environments. For example, service provisioning and resource deployment based on user demand is more easily provided in a cloud environment leveraging virtualized architectures. A virtualized cloud environment may include virtual machines, containers, or a mixture of virtual machine and container computing instances.

BRIEF SUMMARY

The present disclosure provides for creation of arbitrary groups of virtualized instances based on services to be provided. The groups may be arranged logically according to the service to be provided. For example, a service provider operating a cloud environment may arrange virtualized instances to provide load-balancing, security, or network management services.

One aspect of the disclosure provides a system, including a plurality of network endpoints, each endpoint being a virtual or physical computing device, the plurality of network endpoints forming a network endpoint group (NEG) for performing tasks associated with an application. The system further includes a NEG controller, the NEG controller comprising one or more processors configured to receive control data from the network endpoints in a given NEG, monitor data request ingresses and backend services, determine, based on at least one of the received control data or the monitoring, whether to add an endpoint to the given NEG or remove an endpoint from the given NEG, when it is determined to add an endpoint, identify the endpoint to add and a corresponding IP address for the identified endpoint, and send control data for updating forwarding rules based on the IP address.

In some examples, each network endpoint may be a container or a virtual computing instance. A first of the plurality of network endpoints may be located at a first location while a second of the plurality of network endpoints may be located at a second location different from the first location. The NEG controller may be further configured to initiate a port scan to identify an available port through which the identified endpoint can receive and transmit data requests associated with the application.

In some cases, the system may include multiple NEGs, each of the multiple NEGs having an associated NEG controller that may be configured to synchronize with other NEG controllers. The NEG controller may be further configured to synchronize addresses in a network endpoint object with the NEG.

Another aspect of the disclosure provides a method of scaling a network endpoint group (NEG). The method includes receiving, by one or more processors, control data from endpoints in a given NEG, the endpoints being virtual or physical computing devices grouped together to perform tasks associated with an application, monitoring, by the one or more processors, data request ingresses and backend services, determining, by the one or more processors based on at least one of the received control data or the monitoring, whether to add an endpoint to the given NEG or remove an endpoint from the given NEG, when it is determined to add an endpoint, identifying the endpoint to add and a corresponding IP address for the identified endpoint, and updating, by the one or more processors, forwarding rules based on the assigned IP address.

According to some examples, the method may further include nitiating, by the one or more processors, a port scan to identify an available port through which the identified endpoint can receive and transmit data requests associated with the application.

According to some examples, updating the forwarding rules includes transmitting second control data to a load balance controller, recalculating load balancing of data requests for the NEG as updated to include the added endpoint, and transmitting, by the load balance controller, the updated forwarding rules to a load balancer for the application, causing the load balancer to redistribute data requests.

Yet another aspect of the disclosure provides a system, including a network endpoint group (NEG) controller, configured to manage end points in a given NEG, a load balance controller, and an application load balancer. The application load balancer is configured to load balance data requests distributed to network endpoints in the given NEG, and forward data requests to an endpoint in the given NEG that has been configured to process the data request associated with a particular backend service application. The NEG controller may be further configured to receive control data from the endpoints in the given NEG, monitor data request ingresses and backend services for the NEG, determine, based on at least one of the control data or the monitoring, whether to scale the NEG up or down by adding or removing endpoints, and transmit control data to load balance controller for updating forwarding rules. The load balance controller may be further configured to receive the control data from the NEG Controller, recalculate load balancing of data requests, and transmit updated forwarding rules to application load balancer. The application load balancer may be further configured to receives IP address:port tuples for each endpoint within the given NEG, and redistribute data requests based on the recalculated load balancing. According to some examples, the system may further include a target proxy, the target proxy configured to route incoming data requests to an application load balancer based on a URL map.

BRIEF DESCRIPTION OF THE DRAWINGS

The drawings are not necessarily to scale.

DETAILED DESCRIPTION OF THE DRAWINGS

Figure 1:
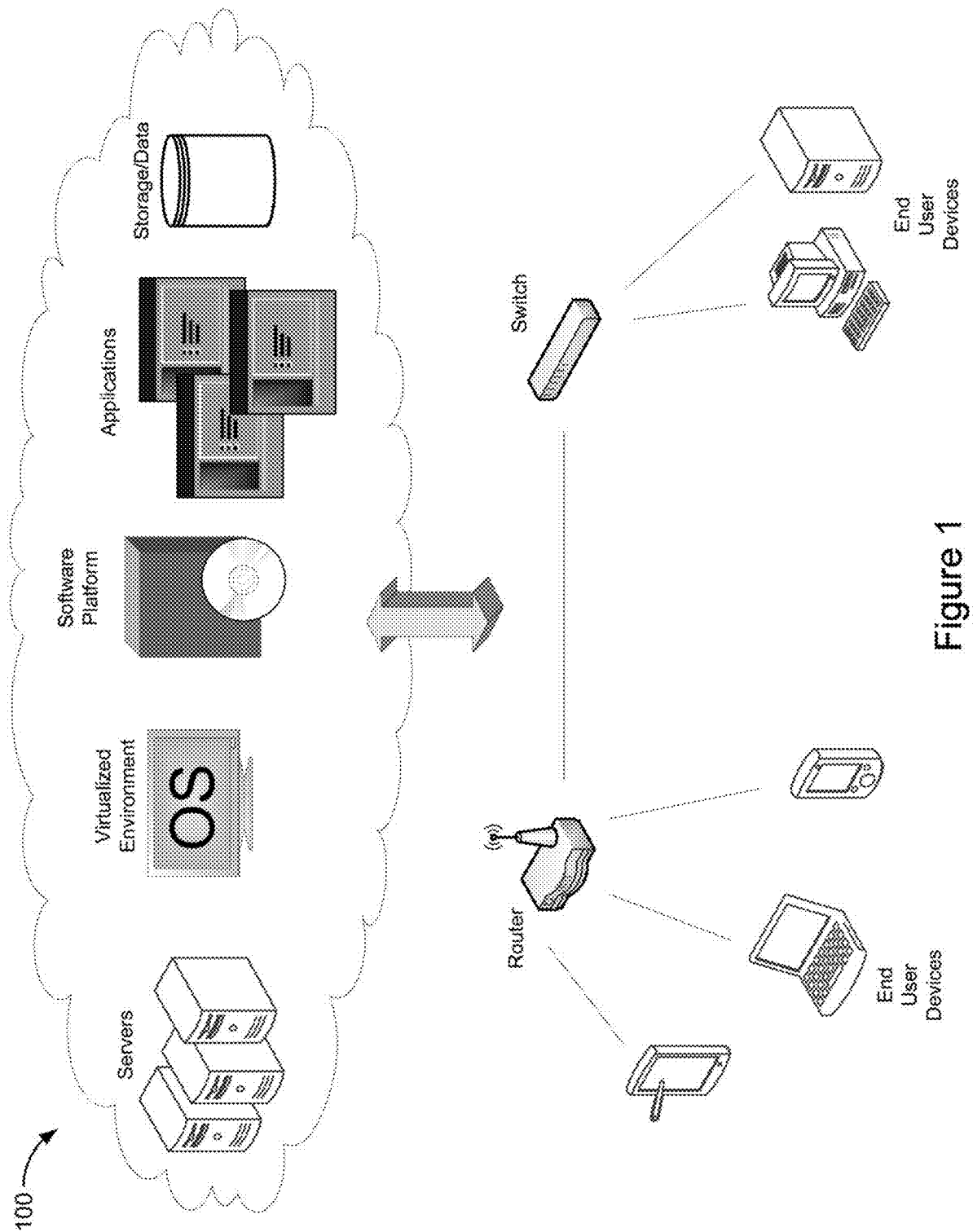
FIG. 1 shows a system diagram of a cloud computing environment.

In this disclosure, cloud-based load balancing techniques are disclosed that utilize network endpoint groups (NEGs) of virtualized and/or non-virtualized computing instances to enable greater scalability and performance for backend service provision. Users may benefit from greater performance in a cloud computing environment when load balancing capabilities are extended to network endpoint groups within the cloud environment. For example, backend services deployed as network endpoint groups with load balancing functionality are capable of distributing backend service traffic more evenly than earlier cloud environments that did not leverage network endpoint groups. A backend service resource may support a NEG as a target for load balancing. The backend service may contain one or more backends, where each backend is one instance group or one NEG. The backend service knows which instances or network endpoints it can use, how much traffic the instances/endpoints can handle, and how much traffic they are currently handling.

Grouping virtualized computing instances in cloud environments can be achieved utilizing groups of network endpoints, also known as network endpoint groups. A network endpoint may be an internet-capable computer, an integrated circuit processor, hardware device or a virtualized computing instance. The network endpoint may include a router, switch, server, mobile device or host computer connected to the TCP/IP network. In some implementations, a network endpoint may also include a bare metal environment, where a virtual machine is installed directly on hardware rather than within a host operating system. A network endpoint may also include virtualized computing instances, for example, one or more virtual machines, one or more container instances or a mixture of both virtual machines and container instances. The network endpoints may further be configured in groups, e.g., as a network endpoint group, to provide a logical grouping for the providers of backend services that may be arranged on the bare metal machines, virtual machines and/or container instances. The network endpoint groups may be organized based on the backend service to be provided by the computing environments that operate as network endpoints within the network endpoint group. The network endpoint groups, and the network endpoints included therein, may be managed using a framework of tools, libraries and application programming interfaces (APIs).

A network endpoint group (NEG) refers to a logical grouping or collection of network endpoints. A NEG may be configured to support one or more backend services. For example, a NEG may be configured by grouping a plurality of servers to deliver streaming media content to users over the internet. In other examples, a NEG may be configured by grouping one or more servers or other computing instances to host email applications or web pages, provide document management or file backup services. In some examples, a NEG may be configured with network endpoints to authenticate secure data requests, provide medical record data processing, provide content and process data requests associated with social media, online banking, retail, government applications, or any other software application. In addition, a NEG may be configured to provide platforms, services or infrastructures such as Software-as-a-Service (SaaS), Platform-as-a-Service (PaaS), and/or Infrastructure-as-a-Service (IaaS). Service providers may load balance service traffic to the backend services that are associated with a particular NEG as a way of optimizing computing resources and managing data quality and user experience for the backend service. In order to enable load balancing to one or more NEGs, the network endpoints configured within a NEG are associated with respective IP addresses or respective IP address:port tuples.

A backend service load balancer may be configured in a cloud computing environment to identify the network endpoints (e.g., the virtualized or non-virtualized computing instances grouped in a NEG as the backend service target) in order to distribute load balanced service traffic. For example, a backend service load balancer may be configured to manage and distribute service traffic flows to containers on the virtual machines configured as network endpoints within the NEG for which the backend service is associated. Load balancing service traffic to NEGs may also enable improved load balancing for container architectures or any micro-service architecture in which the backend service application may benefit from finer service granularity than backend service applications that are load balanced on a per-virtual machine basis or on a per physical host basis. For example, load balancing service traffic to network endpoints implemented in virtual machine environments typically involves distributing the backend service traffic to specific virtual machine instances with a known IP address. The virtual machine instances then further distribute the backend service traffic to the network endpoints within the virtual machine instance leading to less even traffic distribution. The problem of sub-optimal load balancing and uneven backend service traffic distribution is reduced in a virtualized backend service architecture that leverages virtual machine instances configured with multiple IP addresses. By aliasing IP address ranges, the virtual machine instance (VM) can host multiple backend service applications. For example, multiple backend services or backend service applications can be configured on one or more virtualized computing instances such as on virtual machine instances, containers or a mix of virtual machine instances and containers and each virtualized computing instance can be configured with a separate, routable, IP address or IP address:port tuple.

NEGs enable the IP address:port tuples of the virtual computing instances providing the backend services to be grouped and allow a load balancer to more robustly distribute service traffic that is associated with a particular backend service. A load balancer may then identify and directly target particular virtualized computing instances providing the backend service to distribute traffic to the backend service for processing. A backend service is a service or application that processes data requests and outputs data associated with the type of service for which the backend is configured. For example, a backend service may include, without limitation, streaming video service, a financial application or an encrypted data processing service. The backend service receives user requests that are associated with a particular service traffic type.

The network endpoints within NEGs may be configured to receive different types of load balanced service traffic. For example, the network endpoints within a NEG may be configured to receive service traffic from a backend service load balancer. In some implementations, the backend service load balancer may receive service traffic from an HTTP/HTTP(S) target proxy, a TCP target proxy and/or an SSL target proxy. The target proxies may distribute service traffic corresponding to the service traffic type for which it is configured to one or more of the network endpoints (e.g., the IP address:port tuples,) that have been configured in the NEG.

Load balancing NEGs can be zonal, meaning that a NEG may be created in a zone. A zone may include one or more NEGs. Each NEG may include one or more virtualized or non-virtualized computing instances operating as backend service application instances. For example, an on-line retail corporation may establish zones geographically to serve web content and process business transactions from users based on location. A zone on the east coast of the United States may include one or more NEGs and each NEG within the east coast zone may include one or more virtualized or non-virtualized computing instances to process purchasing transaction data and provide inventory management associated with the corporation's business operations on the east coast. Network endpoints may be added to or removed from a NEG that is created in a zone, for example as the volume of data request grows or diminishes. Validation checks may be run on the added network endpoints to ensure they are operating as specified or configured based on the backend service that the network endpoints (or NEG) provide. Empty NEGs may be configured for a particular backend service and the membership of the NEG may be adjusted by adding network endpoints.

NEGs preferably meet some additional conditions to load balance data requests and service traffic in cloud based environments that are configured with virtual machines and/or containers. For example a NEG may include a network endpoint configured as a VM instance. In some implementations the VM instance may be configured to provide the backend service. In other implementations the VM instance may host a containerized virtual computing instance that is configured to provide the backend service. The IP address (or IP address:port tuple) of a network endpoint preferably belongs to the specific virtual computing instance providing the backend service regardless of how the virtual computing instance is configured. A unique port may be specified for each virtual computing instance that is associated with the backend service provided by the NEG. All IP address:port tuples in the NEG are preferably unique addresses. The IP address:port tuple is preferably not associated with or part of any other load balancing NEG.

Various backend service management platforms or tools can be used to manage NEGs implemented in environments of virtualized computing instances. These tools operate as backend service orchestrators and expose public application programming interfaces (APIs). The APIs can be used to manage the virtual machines or containers within the cloud computing environment. Example tools for backend service orchestration and management include Kubernetes, Apache Mesos, and Cloud Foundry. More specifically, these tools are designed to automate deploying, scaling and operation of backend services configured as application containers. For example, using Kubernetes, a load balancer may target container pods. A pod may include a group of one or more containers. A pod may encapsulate an application container or multiple application containers. Containers in a pod may be deployed together, and may be started, stopped, and replicated as a group. Pods provide a model for grouping multiple cooperating processes which form a cohesive unit of service. Pods may also enable data sharing and communication among their constituents. Pods and the containers therein may be identified by IP address:port tuples. The applications in a pod may use the same network namespace (e.g., IP address and port space). In addition, applications in a pod may coordinate their usage of ports. Each pod may have an IP address in a flat shared networking space that has full communication with other physical computers and pods across the network. Pods may also specify and include a set of shared storage volumes. The shared storage volumes may enable data to persist through container restarts and may be shared among the applications in the pod. The backend service orchestrators may also perform health checks on pods, container, virtual machine instances, and/or non-virtual machine instances directly using the port specified by the NEG. For example, the backend services may monitor the usage and health of instances. The backend services know whether the instances in a group can receive traffic or not. If the instances cannot receive traffic, the load balancer redirects traffic to other instances provided that the other instances have sufficient capacity.

FIG. 1 is a system diagram of a cloud computing environment 100. As shown in FIG. 1, a cloud computing environment 100 includes servers, virtualized OS environments, software platforms, applications, storage/memory and combinations thereof. End user devices may access the cloud environment 100 by passing data requests through a network of routers and/or switches. The routers or switches may be configured to transmit the data requests to the various cloud computing resources by determining the corresponding backend service that is associated with the data request. In some implementations, the routers and/or switches may be configured to route data requests to a particular backend based on a forwarding rule identifying the IP address:port tuples of the virtual machines or containers within a NEG that is associated with the particular backend service. In a simple example, a content service provider may have a cloud computing environment to deliver streaming media content (such as videos or movies) to users. A user may access the content service provider's media using a wireless tablet, smart phone or desktop computer. A router or switch may be configured to forward the users data request (e.g., to download a movie) to the appropriate backend service which has been configured to provide downloads of videos or movies. The backend service for the movie or video provisioning may be configured as a plurality of virtualized computing instances in the content service provider's cloud computing environment. As discussed above, the virtualized computing instances may be network endpoints that are grouped in a NEG. The NEG, for example, may be created in a zone established by the content service provider to manage and process data requests from users on the East coast of the United States. The content service provider may create a second NEG, created in a second zone to manage and process data requests from users on the West coast of the United States. By implementing a NEG in each zone, the content service processing may be load balanced across the network endpoints that are grouped within each NEG. As will be described in more detail later, NEGs enable load balancing of data requests to specific virtualized or non-virtualized computing instances within the NEG using the unique IP address:port tuples of the virtual machines, bare metal environments and/or containers that have been configured within in the NEG.

Figure 2:
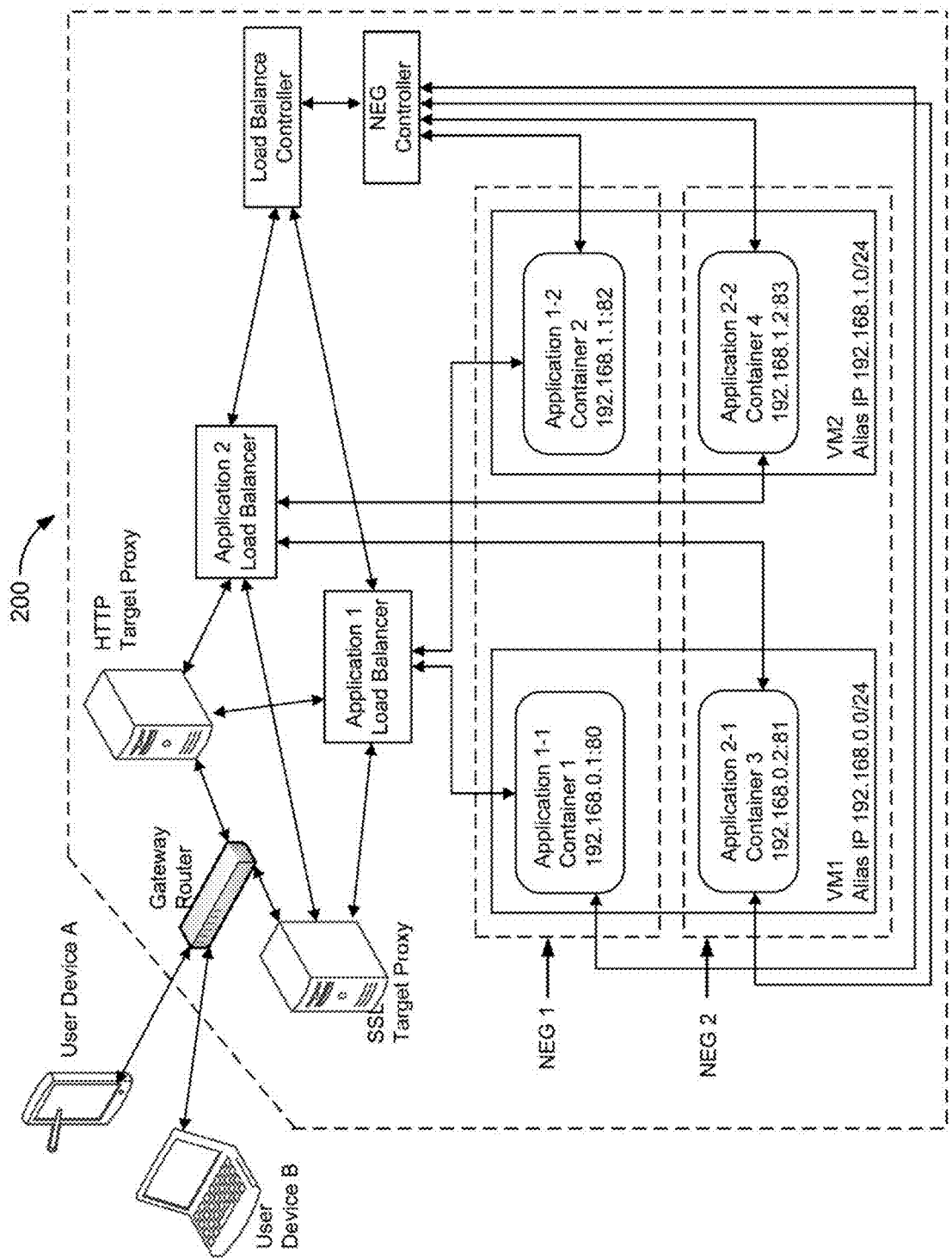
FIG. 2 shows a system diagram of a cloud computing environment including network endpoint groups.

FIG. 2 is a system diagram of a cloud computing environment 200 including network endpoint groups. As shown in FIG. 2, User devices (e.g., User Device A and User Device B) transmit data requests to the cloud computing environment 200. The cloud computing environment 200 includes a Gateway Router, one or more Target Proxies (e.g., an SSL Target Proxy, and HTTP Target Proxy) and one or more Application Load Balancers (e.g., Application 1 Load Balancer and Application 2 Load Balancer). The cloud computing environment 200 further includes one or more NEGs (e.g., NEG 1 and NEG 2). Each NEG includes one or more virtualized computing instances (e.g., Container 1-Container 4). The cloud computing environment 200 also includes a NEG controller and a Load Balance Controller.

As further shown in FIG. 2, User Device A and User Device B (also referred to as user device and user devices) are attempting to access data from a network. Configured in the network is a cloud computing environment which provides backend services to users via user devices. User Device A is a tablet but could be a desktop computer, a smartphone, a laptop, or any computing device capable of accessing and interoperating with the internet. For example, a user device may transmit data requests for streaming media content provided by a content service provider. The content service provider may configure a cloud computing environment to provide the content. The content may be served by backend services implemented as virtualized computing instances that are organized in NEGs. The data requests and service traffic received from the user devices may be load balanced by load balancers that are specifically configured to distribute the data requests and service traffic among the virtualized computing instances within the NEGs.

As shown in FIG. 2, User Device A and User Device B transmit data requests to a Gateway Router. The Gateway Router may include routing tables or other forwarding data to route internet protocol (IP) data requests, e.g., packets of data. The data requests are associated with a particular backend service or backend service application that a user is attempting to access in the cloud computing environment 200. The data requests may include service traffic types such as SSL, HTTP, and HTTPS. The Gateway Router may receive the data requests from the user device and forward the data request to an appropriate target proxy based on the service traffic type of the data request. The Gateway Router may also forward the received data request to the appropriate target proxy based on the backend service or NEG corresponding to the application associated with the data request. For example, assume the Gateway Router receives a data request for Application 1 from User Device A and determines that the data request is HTTP service traffic. In such an instance, the Gateway Router forwards the data request to the HTTP Target Proxy based on a stored forwarding rule.

As shown in FIG. 2, the Target Proxy (e.g., SSL Target Proxy and HTTP Target Proxy), receives data requests from the Gateway Router based on the service traffic type of the data request. For example, SSL data requests are forwarded to the SSL Target Proxy, while HTTP data requests are forwarded to the HTTP Target Proxy. In some implementations, the Target Proxy may be a TCP Target Proxy or a HTTPS Target Proxy. Broadly speaking, a Target Proxy can be referenced by one or more global forwarding rules and route incoming data requests to an Application Load Balancer based on a URL map. The URL map maps URLS of requests to specific backend services and associated application load balancers. The backend service that will process the data request is accessible from the Application Load Balancer. In this way, the Target Proxy forwards the data requests as appropriately intended for the data request. Target Proxys may be created, added, and deleted using methods and APIs within backend service orchestrator tools or platforms.

As shown in FIG. 2, the data request is forwarded to the appropriate Application Load Balancer, (e.g., Application Load Balancer 1 and Application Load Balancer 2), by the Target Proxy. The Application Load Balancer is configured to perform load balancing of data requests and service traffic associated with a particular backend service. The Application Load Balancer is also configured to load balance the distribution and forwarding of data requests to the network endpoints (e.g., the network endpoints that are grouped within the NEG corresponding to the backend service for which the data requests pertain) that will receive and process the data requests. In some implementations, the Application Load Balancers may be configured with load balancing APIs, algorithms, constraints, thresholds or other mechanisms to route data requests based on control data received from a Load Balance Controller.

As further shown in FIG. 2, the Application Load Balancer forwards data requests to a container in a NEG that has been configured to process the data request associated with a particular backend service application. For example, and as shown in FIG. 2, the Application 1 Load Balancer forwards data requests to Container 1 and/or Container 2, arranged within NEG 1 for processing. Similarly, the Application 2 Load Balancer forwards data requests to Container 3 and/or Container 4, within NEG 2 for processing. Each NEG may be a logical grouping of virtualized computing instances (e.g., containers such as Container 1 and Container 2) providing a backend service to process the data request. The Application Load Balancer receives IP address:port tuples for each container or virtual computing instance within a NEG from the Load Balance Controller. The Application Load Balancer utilizes the unique IP address:port tuples to forward data requests to the containers in a distributed manner that is load balanced for the volume and type of data requests as well as the status and performance of the container that processes the data requests. For example, Application 1 Load Balancer forwards data requests associated with Application 1 to network endpoints within NEG 1. NEG 1 contains two Containers (e.g., Container 1 and Container 2) that are each configured with an instance of Application 1. Container 1 is configured with Application 1-1 and Container 2 is configured with Application 1-2. The two containers are respectively configured on separate virtual machine instances (e.g., VM1 and VM2). Each container has a unique IP address:port tuple to receive the data request from Application Load Balancer 1. Either Application Load Balancer may receive the unique IP address:port tuples that are associated with each container from the Load Balance Controller as control data. Based on the received control data, the Application Load Balancer updates the forwarding rules in the Application Load Balancer to distribute the data requests to the container instances that are configured with the backend service application instance in the particular NEG that corresponds to the backend service application. For example, if Container 1, which is configured with Application 1-1, experiences a change in operational status (such as a reduced resource allocation due to the instantiation of other containers on VM1), the Application 1 Load Balancer can direct a greater percentage data requests to Container 2, which is configured with Application 1-2 (a second instance of Application 1).

In some implementations, the Application Load Balancer forwards the data requests to the network endpoints utilizing a load balance scheme that is specific for the network endpoint computing resource. For example, consider a NEG configuration including two containers. Each container may execute on a different processor type and each processor may have different processing characteristics (e.g., number of cores, multi-threading or hyper-threading support, clock speed, power consumption, execution rates). Container 1 may be executing on a low-performance processor while Container 2 may be executing on a higher-performance processor. In such circumstances, the Application Load Balancer may load balance the data requests such that Container 1 receives a smaller proportion of the data requests and Container 2 receives a greater proportion of the data requests.

As shown in FIG. 2, the cloud computing environment is configured with two NEGs (e.g., NEG 1 and NEG 2). Each NEG is configured as a collection of one or more network endpoints, such as containers, which are logically associated based on the backend service to be provided by the containers in the NEG. Because the network endpoints in the NEG have unique IP or IP address:port tuples, the network endpoints within a NEG can be a specific target for a backend service application load balancer. In this way, network endpoints that are grouped to form a NEG provide greater load balancing capabilities and require less redundant load balancing at different architectural levels than is commonly required in backend service architectures implemented on virtual machines which do not uniquely address each containerized instance of an application. For example, as shown in FIG. 2, NEG 1 includes two containers associated with Application 1. Container 1 is implemented with Application 1-1 and has a unique IP address:port tuple of 192.168.0.1:80. Container 2 is implemented with Application 1-2 and has a unique IP::Port address of 192.168.1.1:82. The two containers are implemented on different virtual machines. For example, Container 1 is implemented on VM1, while Container 2 is implemented on VM2. The unique IP address:port tuples of each container are aliased from a range of IP addresses and ports that are available on each VM. By using IP address aliasing, a container may be configured with a specific IP address:port tuple that can be used by the Application Load Balancer to distribute load balanced data request or service traffic to the containers in the NEG. For example, Application Load Balancer 2 can distribute data requests and service traffic to Container 3 and Container 4, respectively based on the backend service (e.g., Application 2) that is associated with NEG 2. As shown in FIG. 2, Container 3 is implemented on the same VM as Container 1 even though the two containers are servicing different backend service applications.

As further shown in FIG. 2, each container in a NEG receives and transmits control data with a NEG Controller so that the operational status and processing capacity of each container or virtual computing instance in the NEG are known. For example, if Container 4 experiences a faulty port, a buffer overload, an out-of-memory condition, or any other issue that may affect the operational status of the container, the NEG Controller may receive control data indicating the change of operational status of Container 4 and may transmit control data to the Load Balancer Controller. The Load Balance Controller may recalculate the load balancing of data requests and transmit updated forwarding rules to the Application 2 Load Balancer causing the Application 2 Load Balancer to redistribute the data requests. Based on the change in operational status of Container 4 and the updated forwarding rules, the Application 2 Load Balancer may distribute the data requests to Container 3 to provide the backend service for Application 2. The Load Balance Controller may provide the Application 2 Load Balancer with updated forwarding rules necessary to redirect the Application 2 data requests and service traffic to the unique IP address:port tuple of Container 3. Similarly, the NEG controller may manage control data for containers within a NEG and also between NEGs. For example, if Container 1 and Container 2 of NEG 1 have exceeded their processing capacity or experienced an operational fault, the NEG Controller may leverage functionality within the backend service orchestrator that manages the backend services to adjust the membership of NEG 1 and add a new Container (e.g., a Container 5, not shown) to NEG 1 to service Application 1 data requests. In some implementations, the NEG Controller and the Load Balance Controller are included in the backend service orchestrator that implements the backend services as containers. In other implementations, the NEG Controller and the Load Balance Controller are standalone components.

NEGs utilizing load balanced containers or virtual machines allow for scalable, flexible architecture of backend service that can be rapidly deployed for new backend service applications. In addition to providing a grouping mechanism for backend services, NEGs may be utilized for policy management. For example, NEGs may be implemented with different policies that specify the communication between network endpoints in a NEG. In some implementations, NEGs can be utilized for application profile management. For example, communication contracts or APIs may be implemented in the backend service architecture that specify the specific protocols and ports necessary to establish communication for the execution environments assigned to the NEGs. Application profiles may be associated with NEGs and may define the inbound and outbound communication policies for the execution environments assigned to the NEGs. Application profiles further include definitions of scope that define the level of policy enforcement for the execution environments assigned to the NEGs.

Figure 3:
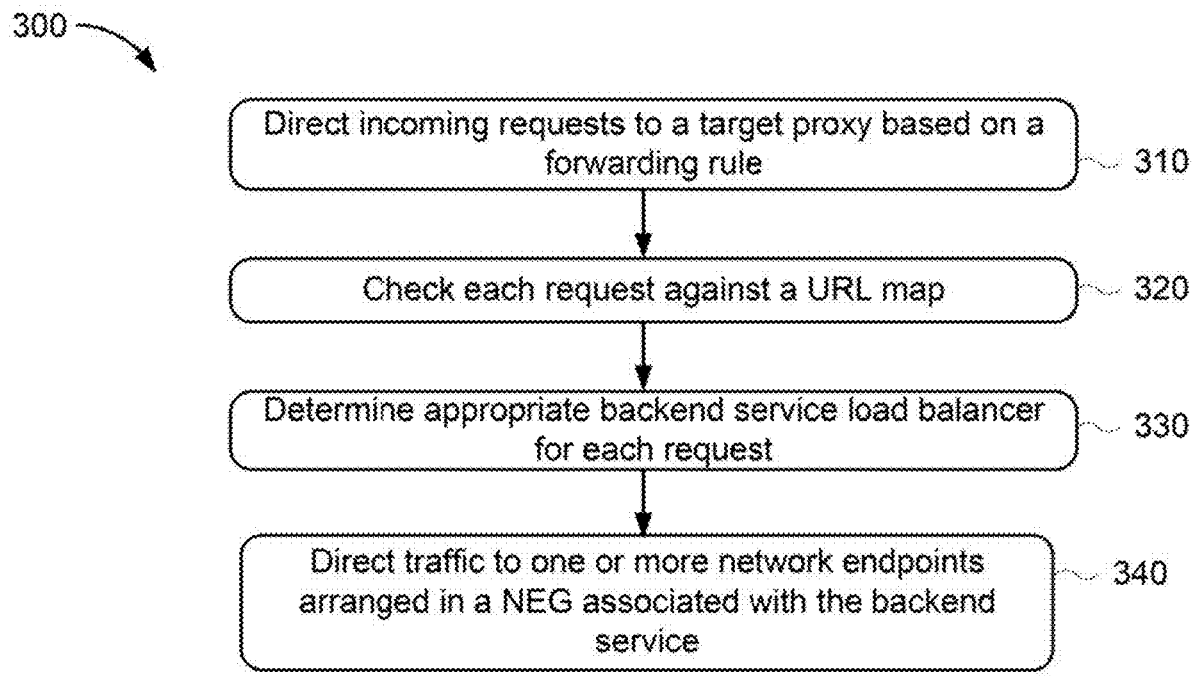
FIG. 3 shows a method for load balancing data requests to backend service containers in a network endpoint group.

As shown in FIG. 3, an exemplary embodiment 300 of a method for load balancing data requests to backend service containers in a NEG is described. The method steps and components may be implemented in a backend service orchestrator platform using an ingress API. The ingress API defines the collection of rules that allow data requests to reach the backend service containers. For example, the ingress API configures an ingress load balance object which may be further configured to populate endpoint objects for network endpoints to be configured in a NEG. The ingress load balance object also holds the forwarding rules, target proxies, and uniform resource locator (URL) map used to implement a particular backend service. The method includes directing incoming requests to a target proxy based on a forwarding rule (stage 310) and checking each incoming request again a URL map (stage 320). The method further includes determining an appropriate backend service for each request (stage 330) and directing traffic to one or more application instances of a NEG associated with the backend service (stage 340).

As further shown in FIG. 3, a Gateway Router may be configured with a forwarding rule to direct incoming data requests (or service traffic) to a target proxy (stage 310). Target proxies are referenced by one or more global forwarding rules and route incoming data requests and service traffic to an Application Load Balancer.

As shown in FIG. 3, the target proxy checks each incoming request against a URL map (stage 320) and determines the appropriate backend service load balancer for each request (stage 330). The URL map may provide a mapping or table which maps, for each service traffic type that a Target Proxy is configured to process, the appropriate backend service load balancer (e.g., the Application Load Balancer) to receive the data request. The URL map identifies the appropriate Application Load Balancer to receive the data request based on the backend service application for which the data request pertains. For example, if an incoming data request is an HTTPS service traffic type and pertains to secure medical record data, the HTTPS Target Proxy may compare the incoming data request to the listings identified in the URL map and determine the specific Application Load Balancer configured to receive the secure medical record data requests and load balance those data requests across the containers that have been configured to provide the backend service for processing secure medical record data.

At stage 340, the backend service load balancer directs traffic to one or more network endpoints arranged in a NEG that is associated with the backend service.

Figure 4:
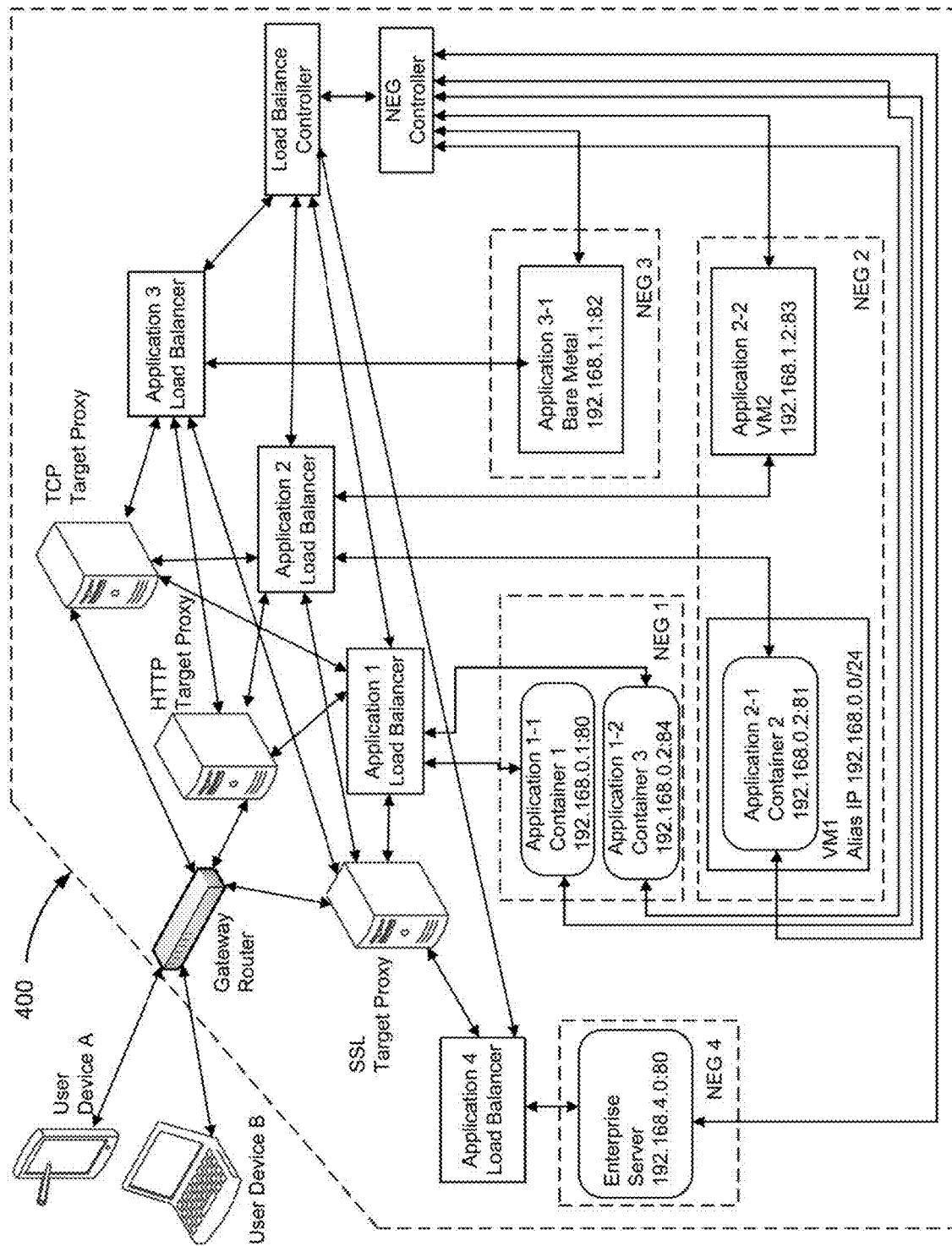
FIG. 4 illustrates an example block diagram of a cloud computing environment supporting multiple backend services using multiple network endpoint groups.

FIG. 4 is an example block diagram of a cloud computing environment supporting multiple backend services using multiple network endpoint groups. In broad overview, and as shown in FIG. 4, a cloud computing environment 400 may be configured to load balance backend service data requests and service traffic to multiple NEGs. Each NEG is associated with a corresponding Application Load Balancer to receive data requests from one or more Target Proxies. For example, FIG. 4 includes an SSL Target Proxy, an HTTP Target Proxy, and a TCP Target Proxy. As shown in FIG. 4, four NEGs have been created (e.g., NEG 1-NEG 4) corresponding to 4 backend service applications (Applications 1-4). Each NEG is implemented with a different network endpoint configuration to demonstrate the flexibility of load balancing data requests in a cloud computing environment that is configured with different instantiations of virtual and non-virtual network endpoints within NEGs. For example, NEG 1 is configured with a two standalone containers (e.g., Container 1 and Container 3) to process Application 1 data requests received from the Application 1 Load Balancer. Container 1 has a unique IP address:port tuple (e.g., 192.168.0.1:80), to which the Application 1 Load Balancer may forward data requests of any service traffic type. Container 3 has a unique IP address:port tuple (e.g., 192.168.0.2:84), to which the Application 1 Load Balancer may forward data requests of any service traffic type.

As further shown in FIG. 4, NEG 2 may be configured to process data requests associated with a different backend service or application, such as Application 2. NEG 2 is configured to provide the backend service for Application 2 and includes a container implemented on a VM (e.g., Container 1 implemented on VM1) as well as a standalone VM (e.g., VM2) providing a second instance of Application 2 (e.g., Application 2-2). The Application 2 Load Balancer may distribute data requests and/or service traffic associated with Application 2 to either Container 1 at IP address:port tuple 192.168.0.2:81 or to VM2 at IP address:port tuple 192.168.1.2:83. Application 2 data requests and service traffic may be load balanced to the disparate backend service instantiations within NEG 2 using the unique IP address:port tuples of each virtualized computing instance. As a result, greater flexibility and better utilization of computing resources can be achieved in NEGs that include different types of network endpoints.

As shown in FIG. 4, NEG 3 may include a Bare Metal environment as the network endpoint to receive data requests and service traffic from Application 3 Load Balancer. In this configuration, the backend service application (e.g., Application 3) is configured directly on hardware rather than within a virtualized computing environment. Similarly to the other NEG configuration examples, the implementation of the Bare Metal environment as a network endpoint in NEG 4 providing the backend service instance of Application 3 (e.g., Application 3-1) enables the Bare Metal environment to receive load balanced data requests and service traffic at the unique IP address:port tuple assigned to the Bare Metal environment (e.g., IP address: port tuple 192.168.1.1:82).

As further shown in FIG. 4, NEG 4 may include an Enterprise Server as the network endpoint to receive data requests and service traffic from Application 4 Load Balancer. In this example, Application 4 Load Balancer is only configured to receive data requests that are identified as SSL service traffic. NEG 4 includes an on premise Enterprise Server as the network endpoint. The Enterprise Server is located outside of the data center in which other NEGs may be configured. The Enterprise Service is the network endpoint to provide the backend service for the SSL service traffic. For example, the Enterprise Server may be configured to verify authentication credentials that are forwarded to its unique IP address:port tuple 192.168.4.0:80 from Application 4 Load Balancer. In some implementations, a NEG, such as NEG 4 can include endpoints located in multiple environments and locations. For example, one endpoint of a NEG can be within a data center, while another endpoint in the same NEG can be on-premises in a remote client facility.

In each example shown and described in relation to FIG. 4, the network endpoints (e.g., Container 1 and Container 3, Container 2 on VM1, the Bare Metal environment, the standalone VM, and the Enterprise Server) are configured to transmit and receive control date with the NEG Controller. The NEG Controller transmits and receives control data with the Load Balance Controller. The Load Balance Controller transmits and receives control data with each of the Application Load Balancers to efficiently load balance the data requests and service traffic between the different NEGs.

Figure 5:
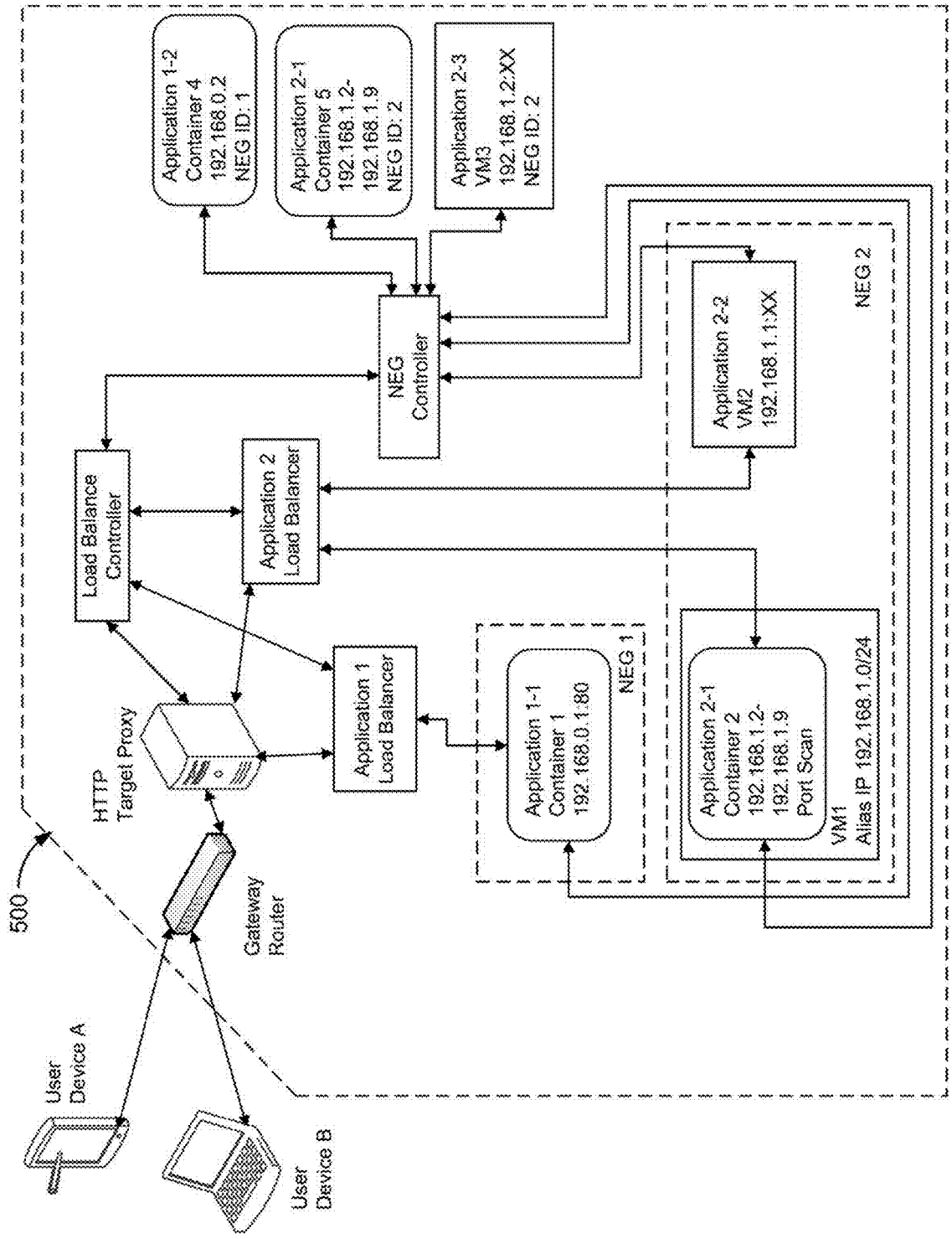
FIG. 5 illustrates an example block diagram of managing network endpoint group membership in a cloud computing environment supporting multiple backend services.

FIG. 5 illustrates an example block diagram of managing network endpoint group membership in a cloud computing environment supporting multiple backend services. As shown in FIG. 5, an HTTP Target Proxy receives HTTP data requests and forwards the data requests to either Application 1 Load Balancer or Application 2 Load Balancer based on the backend service corresponding to the data requests. For example, NEG 1 includes a network endpoint container (e.g., Container 1) providing the backend service for Application 1. NEG 2 includes two network endpoints providing backend service instances of Application 2. One instance of Application 2 includes a container implemented on a VM (e.g., Container 2 on VM1 providing Application instance 2-1) and a second instance of Application 2 includes a standalone VM (e.g., VM2 providing Application instance 2-2). Each of the network endpoints in NEG 1 and NEG 2 communicate with the NEG Controller to receive and transmit control data that may be used to adjust the membership of each NEG.

As shown in FIG. 5, assume that Application 1-1 is a backend service instance implemented on Container 1 that is grouped in NEG 1 and addressable at a unique IP address: port tuple (e.g., 192.168.0.1:80). In this example, Container 1 is operational and processing the data requests from the Application 1 Load Balancer. Assume that no HTTP service traffic associated with Application 2 has been received by the Application 2 Load Balancer. The NEG Controller may determine that a second Container, e.g., Container 4, is required to process the increasing volume of data requests received from the Application 1 Load Balancer. The NEG Controller may add Container 4 to NEG 1 to assist Container 1 processing the increasing volume of HTTP service traffic. The addition of Container 4 to NEG 1 provides more computing resources in NEG 1 and enables greater load balancing of Application 1 service traffic processing across the two Containers now grouped within NEG 1.

Continuing the example of managing network endpoint group membership, Container 2 is a backend service application instance implemented on VM1 within NEG 2. Container 2 may be activated as a network endpoint providing the backend service instance of Application instance 2-1. As new HTTP service traffic is received, the NEG Controller may transmit control data to assign an IP address for Container 2 that is aliased from a range of IP addresses corresponding to VM1 on which Container 2 is implemented. For example, the NEG Controller may determine that Container 2 may utilize an IP address in the range of 192.168.1.2 through 192.168.1.9 based on the range associated with VM1. Further the NEG Controller may initiate a port scan to identify an available port through which Container 2 can receive and transmit data requests associated with Application 2 backend service. The NEG Controller may further maintain an additional container, e.g., Container 5, as a back-up backend service application instance for Application 2 in the event Container 2 fails to operate as expected or has exceeded an operating capacity. Container 5 may be specified to use the same IP address range that is assigned for Container 2 and may further specify NEG membership details (e.g., NEG ID 2) that the NEG Controller may use to add Container 5 to NEG 2 as a new member.

In addition NEG 2 may further include VM2 as a non-active backend service instance of Application 2-2. VM2 has not been assigned a specific port (e.g., as shown by 192.168.1.1:XX) because the NEG Controller has not activated VM2 as a new network endpoint member of NEG 2. In addition the NEG Controller may identify and preconfigure an additional network endpoint to add within NEG 2. For example, the NEG Controller may preconfigure VM3 as an additional network endpoint providing a backend service instance of Application 2 (e.g., Application 2-3) in the event that Container 2 or VM2 fail to operate correctly. The NEG controller may identify the IP address and NEG ID necessary to add VM3 as a new network endpoint within NEG 2. Upon adding VM3 as a new network endpoint member within NEG 2, the NEG Controller may identify the specific port through which VM3 is to receive data requests associated with backend service Application 2.

Multiple NEGs or clusters of NEGs can be managed by synchronizing the Application Load Balancers and NEG Controllers associated with each of the individual NEGs. Each port of a backend service network endpoint may be associated with its own NEG if necessary. If multiple backend services are implemented with overlapping backend service network endpoints or pods, error events associated with related backend services may be generated. For example, if duplicate IP address:port tuples are used for two or more network endpoints traffic may not be able to be efficiently load balanced to the network endpoints and errors may be generated processing data requests. An update to one or more network endpoints within a NEG may trigger a corresponding NEG update which will distribute updated policies or forwarding rules to the NEG, the Application Load Balancers, and all network endpoints included therein. If multiple backend services share the same NEG, the on-demand backend services may be reconciled. If the backend services cannot be reconciled (e.g., due to overlapping network endpoints) or cannot be reconciled without introducing a service disruption (e.g., creating a new NEG and configuring the associated Application Load Balancer), the user may be unable to configure a cluster of NEGs as desired. Having one NEG per backend service simplifies the design and reduces error conditions.

The NEG Controller provides centralized NEG management. The NEG Controller may monitor data request ingresses, backend services and network endpoints grouped within NEGs. The NEG Controller may execute methods to create, delete, and/or synchronize NEGs if needed. For example, some networks may be set up to have at least one NEG per zone. In other examples, if the number of endpoints in a given NEG reaches a maximum number supported, a new NEG may be created. For example, the NEG Controller may synchronize all addresses in a network endpoint object with the NEG. NEG Controllers may reference NEGs by name using a specific NEG naming convention. In some implementations, the NEG Controller and/or backend service orchestrator may include a user interface to allow manual configuration of NEGs.

The NEG Controller may enable a control loop which may operate to create NEGs when a backend service is referenced by ingressing data requests or when an Application Load Balancer is created. The NEG Controller may delete NEGs when no ingress data request references the backend service or when an Application Load Balancer is deleted. Garbage collection may be performed for any remaining NEGs in the cluster when resynchronization is initiated. New network endpoints may be attached to a NEG when addresses become available in the network endpoints object. Network endpoints may be detached from a NEG when addresses are removed from the network endpoints object or are otherwise not available.

In some implementations, a user may create a NEG and/or delete a NEG by interacting with a user interface or a command line programming interface. The user interface or command line programming interface may be provided by the NEG Controller. In other implementations, the user interface or command line programming interface may be provided by the backend service orchestrator platform. In some implementations, a user may list all the NEGs in a project by interacting with the user interface or command line programming interface. In other implementations, a user may specify a filter expression to list only specific NEGs by interacting with the user interface or command line programming interface. In some implementations, a user may interact with the user interface or command line programming interface to receive the details associated with a specific NEG. Additionally, or alternatively, in some implementations, a user may interact with the user interface or command line programming interface to add network endpoints to an existing NEG. In other implementations, a user may interact with the user interface or command line programming interface to remove network endpoints from an existing NEG. In some implementations, a user may interact with the user interface or command line programming interface to list all the network endpoints in a NEG. In other implementations, a user may interact with the user interface or command line programming interface to attach a NEG as a backend service of an Application Load Balancer. In some implementations, a user may interact with the user interface or command line programming interface to health check the network endpoints that include backend service application instances.

As mentioned above, APIs can be utilized by the user interface or through the command line programming interface to interact with and manage the NEGs, such as by performing various load balancing methods. Examples of such load balancing methods include creating an NEG in a specified project, deleting specified NEG, returning a specified NEG or a list of NEGs located in a specified project or sorted by zone, attaching additional network endpoints to a specified NEG, detaching particular network endpoints from a specified NEG, etc.

With regard to deletion, according to some examples, an NEG may only be deleted if no backend services reference it. Traffic destined to network endpoints in the NEG may be drained, but the network endpoints themselves and the VM instances they belong to are not necessarily deleted.

With regard to attaching additional network endpoints, a list of endpoints may be attached to a specified NEG. According to some load balancing examples, one or more conditions may apply. Examples of such conditions include that the VM instance be specified with each network endpoint, that the IP address for a network endpoint belong to the specified VM instance, that the specified VM instance belong to a zone and network in the NEG resource, that the port be specified with each network endpoint or a default port be specified in the NEG, and that all IP:port values in the NEG are unique.

With regard to detaching network endpoints, a list of one or more endpoints may be detached from a specified NEG. This call does not terminate the containers or VM instances associated with the network endpoint IP addresses.

Removal of a network endpoint from a load balancing NEG may trigger connection draining based on drain parameters specified in the backed service. If multiple backend services refer to the same NEG, then a maximum drain interval across all backend services may be applied. In some examples, if the VM instance is deleted, then any NEG that has a reference to it is automatically updated. The delete may cause all network endpoints on the VM to be removed from the NEG without connection draining.

Figure 6:
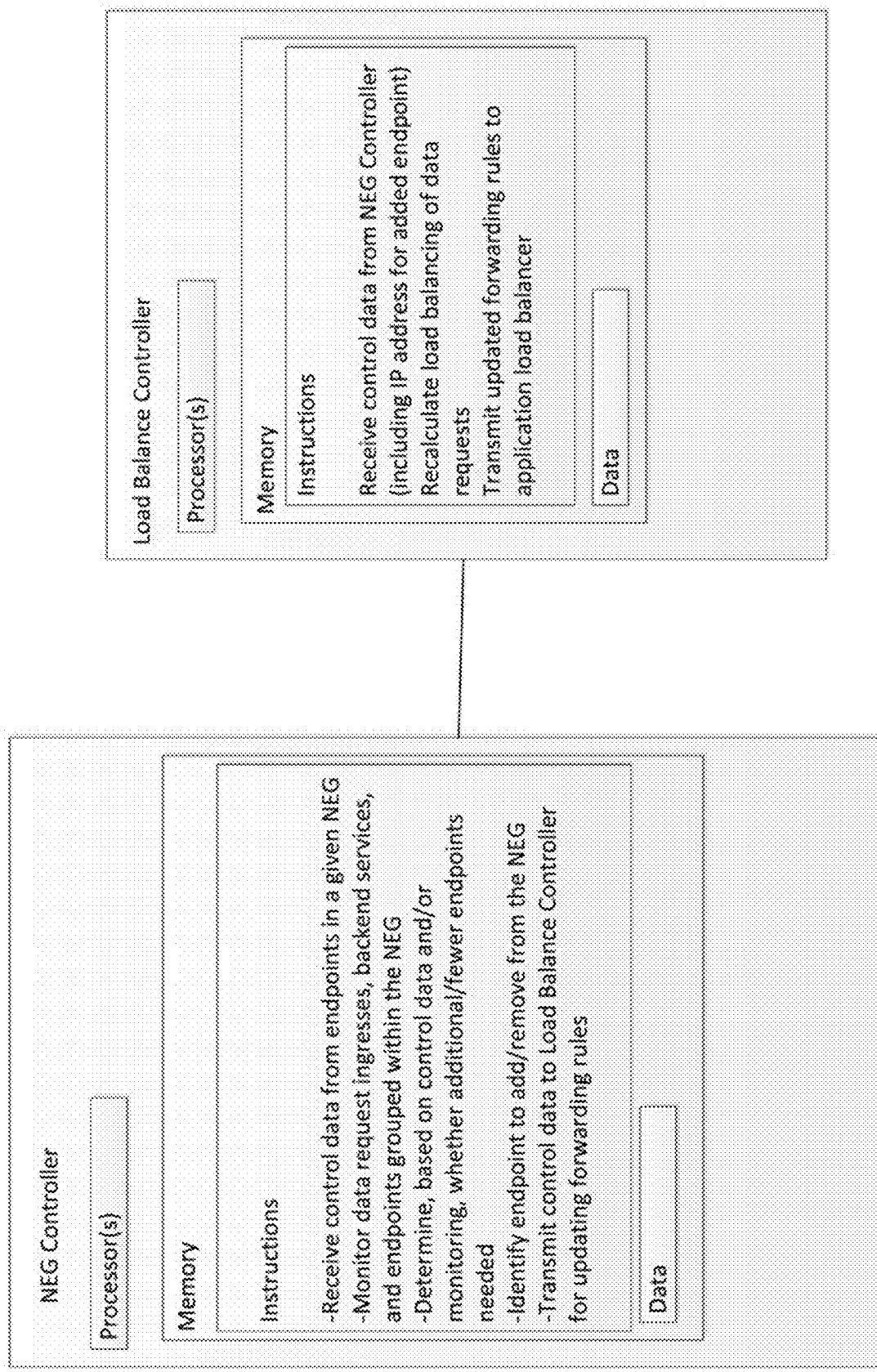
FIG. 6 is an example block diagram of a network endpoint group controller and a load balancing controller, according to aspects of the disclosure.

FIG. 6 is a block diagram illustrating operation of an example NEG controller and an example Load Balance Controller. Each controller may include, for example a memory storing data an instructions, and one or more processors configured to execute the instructions, such as to perform a particular method. Further details regarding the memories and processors and other components are discussed below in connection with FIG. 7.

The NEG Controller, as shown in FIG. 6, is configured to receive control data from endpoints in a given NEG. The control data may include, for example, information regarding an operational status of one or more containers or computing instances in the NEG. In addition to receiving the control data, the NEG Controller may in some examples monitor other conditions related to the NEG. For example, the NEG Controller may monitor data request ingresses, backend services, and endpoints grouped within the NEG. Based on such information, the NEG Controller may determine whether the NEG should be scaled up or down, for example, whether additional or fewer endpoints are needed in the group. If additional endpoints are needed, the NEG Controller may identify an endpoint or container, which has a corresponding IP address. For example, the corresponding IP address may be aliased from a range of IP addresses assigned to a virtual machine hosting the container. The NEG Controller further transmits control data to the Load Balance Controller for updating the forwarding rules.

The Load Balance Controller receives the control data from the NEG Controller. In the case of adding an endpoint, such control data includes the IP address assigned to the added endpoint. The Load Balance Controller recalculates the distribution of the load in view of the updated NEG. For example, in the case of an added endpoint, the Load Balance Controller may distribute data requests among the added endpoint as well as the other endpoints in the group. The Load Balance Controller may further transmit updated forwarding rules to the application load balancer, such that the application load balancer can utilize the assigned IP address and forwarding rules to transmit requests to the NEG.

In some examples, applications for which NEGs are created may be serverless applications. In such examples, IP addresses may not be available until a request is sent. Rather than the NEG Controller assigning an IP address or IP port, it may identify the endpoint by name. For example, the endpoint may be identified by a route, subroutine, region, etc.

While NEGs are primarily described herein in connection with load balancing applications, it should be understood that the NEGs may be implemented in a wide variety of use cases. For example, NEGs may be implemented for routing, firewall, etc.

Figure 7:
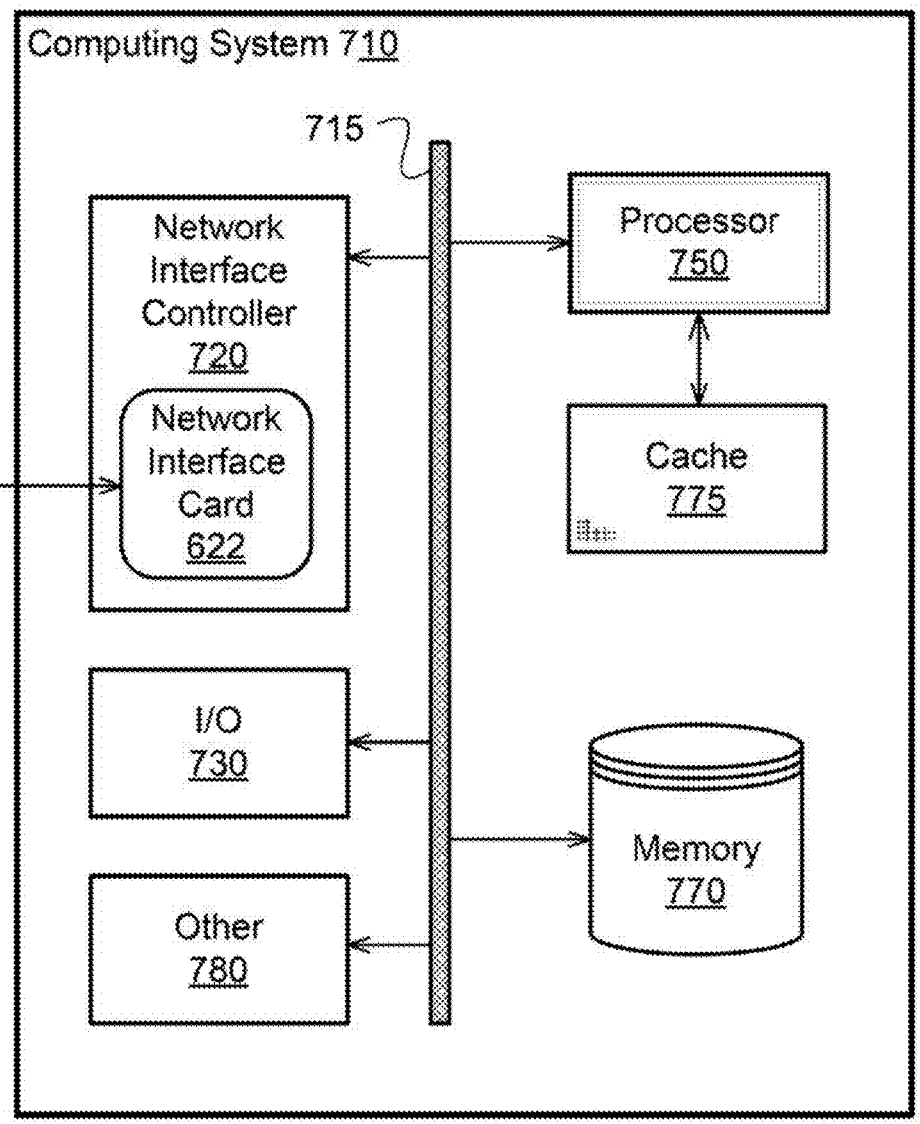
FIG. 7 is a block diagram of an example computing system.

FIG. 7 is a block diagram illustrating a general architecture for a computer system 700 that may be employed to implement elements of the systems and methods described and illustrated herein, according to an illustrative implementation.

In broad overview, the computing system 710 includes at least one processor 750 for performing actions in accordance with instructions and one or more memory devices 770 or 775 for storing instructions and data. The illustrated example computing system 710 includes one or more processors 750 in communication, via a bus 715, with at least one network interface driver controller 720 with one or more network interface cards 722 connecting to one or more network devices 724, memory 770, and any other devices 780, e.g., an I/O interface. The network interface card 722 may have one or more network interface driver ports to communicate with the connected devices or components. Generally, a processor 750 executes instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 750 is a microprocessor unit or special purpose processor. The computing device 700 may be based on any processor, or set of processors, capable of operating as described herein. The processor 750 may be a single core or multi-core processor. The processor 750 may be multiple processors. In some implementations, the processor 750 can be configured to run multi-threaded operations. In some implementations, the processor 750 may host one or more virtual machines or containers, along with a hypervisor or container manager for managing the operation of the virtual machines or containers. In such implementations, the method shown in FIG. 3 can be implemented within the virtualized or containerized environments provided on the processor 750.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 700 may have any number of memory devices 770. In some implementations, the memory 770 supports virtualized or containerized memory accessible by virtual machine or container execution environments provided by the computing system 710.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface driver controller 720 manages data exchanges via the network interface driver 722 (also referred to as network interface driver ports). The network interface driver controller 720 handles the physical and data link layers of the OSI model for network communication. In some implementations, some of the network interface driver controller's tasks are handled by the processor 750. In some implementations, the network interface driver controller 720 is part of the processor 750. In some implementations, a computing system 710 has multiple network interface driver controllers 720. The network interface driver ports configured in the network interface card 722 are connection points for physical network links. In some implementations, the network interface controller 720 supports wireless network connections and an interface port associated with the network interface card 722 is a wireless receiver/transmitter. Generally, a computing device 710 exchanges data with other network devices 724 via physical or wireless links that interface with network interface driver ports configured in the network interface card 722. In some implementations, the network interface controller 720 implements a network protocol such as Ethernet.

The other network devices 724 are connected to the computing device 710 via a network interface driver port included in the network interface card 722. The other network devices 724 may be peer computing devices, network devices, or any other computing device with network functionality. For example, a first network device 724 may be a network device such as a hub, a bridge, a switch, or a router, connecting the computing device 710 to a data network such as the Internet.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 700 includes an additional device 780 such as a coprocessor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A system, comprising:
    a plurality of network endpoints, each endpoint being a virtual or physical computing device, the plurality of network endpoints forming a network endpoint group (NEG) for performing tasks associated with an application; and
    a NEG controller, the NEG controller comprising one or more processors configured to:
    receive control data from the network endpoints in a given NEG;
    monitor data request ingresses and backend services;
    determine, based on at least one of the received control data or the monitoring, whether to add an endpoint to the given NEG or remove an endpoint from the given NEG;
    when it is determined to add an endpoint, identify the endpoint to add and a corresponding Internet Protocol (IP) address for the identified endpoint; and
    send control data for updating forwarding rules based on the IP address.

2. The system of claim 1, wherein each network endpoint is a container or a virtual computing instance.

3. The system of claim 1, wherein a first of the plurality of network endpoints is located at a first location and a second of the plurality of network endpoints is located at a second location different from the first location.

4. The system of claim 1, wherein the NEG controller is further configured to initiate a port scan to identify an available port through which the identified endpoint can receive and transmit data requests associated with the application.

5. The system of claim 1, further comprising multiple NEGs, each of the multiple NEGs having an associated NEG controller.

6. The system of claim 5, wherein the NEG controller is further configured to synchronize with other NEG controllers.

7. The system of claim 1, wherein the NEG controller is further configured to synchronize addresses in a network endpoint object with the NEG.

8. A method of scaling a network endpoint group (NEG), comprising:
receiving, by one or more processors, control data from endpoints in a given NEG, the endpoints being virtual or physical computing devices grouped together to perform tasks associated with an application;
monitoring, by the one or more processors, data request ingresses and backend services;
determining, by the one or more processors based on at least one of the received control data or the monitoring, whether to add an endpoint to the given NEG or remove an endpoint from the given NEG;
when it is determined to add an endpoint, identifying the endpoint to add and a corresponding Internet Protocol (IP) address for the identified endpoint; and
updating, by the one or more processors, forwarding rules based on the assigned IP address.

9. The method of claim 8, further comprising initiating, by the one or more processors, a port scan to identify an available port through which the identified endpoint can receive and transmit data requests associated with the application.

10. The method of claim 8, further comprising, when it is determined to remove an endpoint, selecting an endpoint to be removed and detaching the selected endpoint from the NEG.

11. The method of claim 8, wherein the IP address is aliased from a range of IP addresses corresponding to a virtual machine on which the endpoint is implemented.

12. The method of claim 8, wherein the received control data indicates an operational status and processing capacity of each network endpoint.

13. The method of claim 8, wherein updating the forwarding rules comprises transmitting second control data to a load balance controller.

14. The method of claim 13, further comprising recalculating load balancing of data requests for the NEG as updated to include the added endpoint.

15. The method of claim 14, further comprising transmitting, by the load balance controller, the updated forwarding rules to a load balancer for the application, causing the load balancer to redistribute data requests.

16. A system, comprising:
a network endpoint group (NEG) controller, configured to manage end points in a given NEG;
a load balance controller;
one or more application load balancers configured to:
load balance data requests distributed to network endpoints in the given NEG; and
forward data requests to an endpoint in the given NEG that has been configured to process the data request associated with a particular backend service application;
wherein the NEG controller is further configured to:
receive control data from the endpoints in the given NEG;
monitor data request ingresses and backend services for the NEG;
determine, based on at least one of the control data or the monitoring, whether to scale the NEG up or down by adding or removing endpoints; and
transmit control data to the load balance controller for updating forwarding rules.

17. The system of claim 16, wherein the load balance controller is further configured to:
receive the control data from the NEG Controller;
recalculate load balancing of data requests; and
transmit updated forwarding rules to application load balancer.

18. The system of claim 17, wherein the application load balancer is further configured to:
receives IP address:port tuples for each endpoint within the given NEG; and
redistribute data requests based on the recalculated load balancing.

19. A system, comprising:
a network endpoint group (NEG) controller, configured to manage end points in a given NEG;
a load balance controller;
one or more application load balancers configured to:
load balance data requests distributed to network endpoints in the given NEG; and
forward data requests to an endpoint in the given NEG that has been configured to process the data request associated with a particular backend service application; and
a target proxy configured to route incoming data requests to one of the one or more application load balancers, wherein the target proxy is configured to route the incoming data requests to the one of the one or more application load balancers based on a Uniform Resource Locator (URL) map.

* * * * *

UNITED STATES PATENT AND TRADEMARK OFFICE
CERTIFICATE OF CORRECTION

| | | |
|---|---|---|
| PATENT NO. | : 10,812,366 B1 | Page 1 of 1 |
| APPLICATION NO. | : 16/118775 | |
| DATED | : October 20, 2020 | |
| INVENTOR(S) | : Anna Berenberg et al. | |

It is certified that error appears in the above-identified patent and that said Letters Patent is hereby corrected as shown below:

On the Title Page

Item (72), please correct the residence of inventor Prajakta Joshi as follows:
-- Prajakta Joshi, Palo Alto, CA (US) --

Signed and Sealed this
Tenth Day of June, 2025

Coke Morgan Stewart
*Acting Director of the United States Patent and Trademark Office*